United States Patent [19]

Horton

[11] Patent Number: 4,627,503
[45] Date of Patent: Dec. 9, 1986

[54] MULTIPLE LAYER POLYCRYSTALLINE DIAMOND COMPACT

[75] Inventor: M. Duane Horton, Provo, Utah

[73] Assignee: Megadiamond Industries, Inc., Provo, Utah

[21] Appl. No.: 522,896

[22] Filed: Aug. 12, 1983

[51] Int. Cl.$^4$ ............................................. E21B 10/46
[52] U.S. Cl. ...................................... 175/329; 175/410
[58] Field of Search ........................ 175/329, 410, 409

[56] References Cited

U.S. PATENT DOCUMENTS

| | | | |
|---|---|---|---|
| 3,745,623 | 7/1973 | Wentorf | 29/95 |
| 4,109,737 | 8/1978 | Bovenkerk | 175/329 |
| 4,128,136 | 12/1978 | Generoux | 175/410 |
| 4,156,329 | 5/1979 | Daniels et al. | 175/329 |
| 4,219,339 | 8/1980 | Wilson | 51/307 |
| 4,229,186 | 10/1980 | Wilson | 51/297 |
| 4,252,102 | 2/1981 | Phaal et al. | 125/39 |
| 4,255,165 | 3/1981 | Dennis et al. | 51/309 |
| 4,330,044 | 5/1982 | Orr et al. | 175/410 |
| 4,333,540 | 6/1982 | Daniels et al. | 175/329 |
| 4,339,009 | 7/1982 | Busby | 175/410 |
| 4,499,958 | 2/1985 | Radtke et al. | 175/329 |
| 4,527,643 | 7/1985 | Horton et al. | 175/410 |

FOREIGN PATENT DOCUMENTS 37-14902  9/1962  Japan .................................. 175/410

Primary Examiner—Stephen J. Novosad
Assistant Examiner—William P. Neuder
Attorney, Agent, or Firm—Willian Brinks Olds Hofer Gilson & Lione Ltd.

[57] ABSTRACT

A polycrystalline diamond and metal element for use as a cutting element for drilling holes or similar uses. The cutting element comprises a polycrystalline diamond center portion and at least one metal side portion. The metal side portion is made from a soft metal having a Young's Modulus less than approximately $45 \times 10^6$ psi and is selected from a group comprising cobalt, nickel, iron, copper, silver, gold, platinum, palladium and alloys of these metals and intermetallic compounds containing these metals. Since the metal portion is sufficiently yielding the internal stresses formed in the polycrystalline diamond/metal bond during cooling and subsequent attachment to a tool body are signficantly reduced. The reduction the stress in the polycrystalline diamond/metal bond reduces fracturing in the diamond or metal and delamination of the polycrystalline diamond/metal interface during attachment to the tool and during use.

17 Claims, 3 Drawing Figures

MULTIPLE LAYER POLYCRYSTALLINE DIAMOND COMPACT

BACKGROUND OF INVENTION

1. Field of Invention

This invention relates to a cutting element comprising a polycrystalline diamond portion which is bonded between two metal portions. Such cutting elements are commonly shaped and attached to the shaft of a drill bit and are used in drilling holes or other machining operations.

Throughout the following disclosure, the phrase "polycrystalline material" or "polycrystalline diamond" is intended to cover all super abrasion-resistant polycrystalline materials including, but not limited to, polycrystalline diamond, polycrystalline cubic boron nitride, polycrystalline wurtzite, boron nitride and combinations thereof. For convenience, both high pressure forms of boron nitride will be referred to as CBN.

Throughout the following disclosure the phrase "soft metal" is intended to cover a material with a Young's Modulus less than approximately $45 \times 10^6$ psi and is selected from the following group consisting of cobalt, nickel, iron, copper, silver, gold, platinum, palladium, alloys of these metals and intermetallic compounds containing these metals.

2. Prior Art

The prior art is replete with cutting elements formed or shaped from various metals. These cutting elements are traditionally used on tools such as rock drills or drills for machining operations which function with a simultaneous cutting and wedging action. For example, such cutting elements are used in flat drills which comprise a substantially flat portion and a rotatable shaft with a central axis.

In its simplest form the traditional cutting element of a flat drill has planar top portions which are non-perpendicular to the central axis of the shaft. The top of the shaft has four surfaces sloping up from the perimeter surfaces of the shaft towards the central axis, a slit which extends across the top of the shaft and is adapted to receive the cutting element and hold it in a fixed position for the drilling operations.

In these prior art cutting elements the substantially flat portion or blade member has two opposing pentagonal faces. At the top of the substantially flat portion is a chisel edge which is perpendicular to the central axis of the rotatable shaft. The midpoint of the chisel edge intersects the central axis of the shaft. A vertical plane passing through the chisel edge intersects the vertical plane passing through the lines where the pairs of sloped surfaces meet, usually at a non-perpendicular angle. The top end of the flat portion also has two other cutting edges known as the lips of the drill which extend from each end of the chisel edge and slope downward and away from the central portion of the rotatable shaft.

Each lip provides the leading edge to a cutting lip surface which slopes down from the lip and across the top of the substantially flat portion. The pairs of sloping surfaces of the rotatable shaft are positioned below the top of the substantially flat edge portion, thus exposing part of the pentagonal faces of the substantially flat portion. The cutting lip surfaces terminate at the chisel edge.

The flat portion has two additional cutting edges, called the margins which form the leading edges of margin surfaces at the sides of the substantially flat portion. Each margin is substantially parallel to the central axis of the rotatable shaft and extends downward from the lip along an edge of the pentagonal face. The margin and lip meet at the peripheral corner of the flat portion. These margin surface are substantially parallel to each other.

Thus the flat portion has five cutting edges, the chisel edge, two margins and two lips. Each pentagonal face of the flat portion has a margin and a lip and the central end points of the lips provide opposite end points of the chisel cutting edge.

As the drill rotates about its axis, it is forced against a workpiece. As the drill contacts and begins to penetrate the workpiece, the chisel edge is subjected to compressive forces. This results in a wedging or chiseling action whereby the workpiece material displaced by the drilling action moves toward the outer ends of the lips. As this occurs, the lips begin to cut into the workpiece and remove chips or fragments of the workpiece. This cutting action subjects the lips to torsional forces. When a drill is new or recently resharpened, the margins perform no or little cutting action. The peripheral corners, however, remove more material than the inner portions of the lips. As a result, after continued use of the flat drill, the peripheral corners become somewhat rounded. After the peripheral corners where the margin meets the lip begin to wear, the margins increase their function as a cutting edge and the ability of the lips to cut is reduced.

As the lips continue to wear, the compressive forces of the drill must be increased to maintain the ability of the drill to penetrate the workpiece. With workpieces where the drill passes through and out the back side of the workpiece, the dulling of the drill causes burrs or frays at the exit hole of the workpiece as well as requiring increased drilling forces. When the additional drilling forces required reach a predetermined level or where exit holes on workpieces become frayed, it becomes necessary to terminate drilling operations and replace or resharpen the flat drill. The flat drill is usually resharpened by machining the cutting lip planes of the substantially flat portion until the rounded peripheral corners are eliminated. When the cutting lip planes have been machined down to the point where the margins are too short, the drill is no longer an effective cutting element and is discarded.

Recently, the machining of both harder materials as well as more abrasive materials has increased which has introduced a great need for drills which can withstand machining such materials. The use of cutting tools made from wear resistant materials such as polycrystalline diamond or polycrystalline cubic boron nitride to machine harder or abrasive surface has been disclosed. (See U.S. Pat. No. 3,745,623 for Diamond Tools for Machining issued to Robert H. Wentorf, Jr. on Dec. 27, 1971).

In addition to the above tools, non-planar diamond surfaces with an underlying carbide substrate which provides a backing for the diamond layer have been disclosed. (See U.S. Pat. No. 4,109,737 for Rotary Drill Bit issued to Harold Bovenkerk on Aug. 29, 1978 and U.S. Pat. No. 4,333,540 for Cutter Element and Cutter for Rock Drilling issued to William Daniels and John Cheatham on June 8, 1982). These diamond surfaces are in the shape of a dome or wedge and are used for elements in rock drills where they encounter forces that are substantially normal or perpendicular to the diamond-carbide interface. In each of these prior art devices the polycrystalline diamond surface is supported by the carbide structure against forces applied against the polycrystalline diamond.

A recent improvement in cutting elements overcomes many structural problems with the above described prior art and is disclosed in co-pending application Ser. No. 464,401 filed on Feb. 7, 1983 in the names M. Duane Horton and L. Brent Horton and assigned to the same assignee as the present application and which is incorporated herein by reference. This improved cutting element for use in a flat drill has cutting edges which are comprised of polycrystalline diamond or the like mounted to a cemented carbide substrate or a similar hard material which is held by a rotatable shaft with a central axis. The polycrystalline material is mounted to a cemented carbide substrate (typically cemented tungsten carbide) and it is unsupported with respect to torsional forces exerted upon it during drilling. This shaft is adapted for insertion into a drilling machine.

The cutting element is in the form of a substantially flat portion or blade member for a flat drill. The rotatable shaft has four shaft surfaces sloping up from the perimeter of the shaft towards the central axis. A slit through the top of the rotatable shaft divides the sloping shaft surfaces into two pairs of shaft surfaces. This slit holds the substantially flat portion which comprises a cemented carbide substrate having polycrystalline material attached to its top. The carbide substrate has two opposing substantially parallel pentagonal faces. Located at the top of the substrate is an edge which may be rounded and is perpendicular to the central axis of the shaft. This edge is also the intersection of two sloping surfaces located on top of the substrate. Polycrystalline material such as polycrystalline diamond is mounted to both of these substrate surfaces. The leading edge of each polycrystalline diamond coated surface is called a cutting lip edge which lies in a plane which is parallel to the substrate. The cutting lip surfaces meet to form the chisel edge which is located at the uppermost part of the substantially flat portion. The thickness of the diamond at the outermost end of the lip forms a cutting edge called the margin. This flat drill is resharpened as described above by machining the cutting lip planes of the substantially flat portion until the rounded peripheral corners are eliminated. A problem with this cutting element is that the diamond cutting edges are relatively thin and since it is not possible to economically make thick polycrystalline diamond, the number of resharpenings are limited in number.

The substantially flat portion is attached to the rotatable shaft, which is in turn inserted into a drill. When the drill is rotated about its central axis and the cutting edges are forced against a workpiece, the polycrystalline material is unsupported with respect to the torsional forces of drilling.

Another significant problem in the above cutting element resides in the polycrystalline diamond to substrate bond. The cutting element before shaping to the structures described above is formed in a high pressure press. In the formation process cemented tungsten carbide is generally used as a substrate or platform upon which diamond starting material is placed and the combination is then subjected to high temperatures and pressure for a period of time sufficient to form or grow the polycrystalline diamond directly upon the substrate. This formation process is well known in the art and further description herein is deemed unnecessary. In this formation process the interface between the polycrystalline diamond and the cemented tungsten carbide substrate is in a substantially unstressed condition.

After formation the polycrystalline diamond is bonded directly to the cemented tungsten carbide substrate. However, during cooling the cemented tungsten carbide with a much greater coefficient of thermal expansion compared to the polycrystalline material tends to shrink or compress more than the diamond. This difference in the coefficient of thermal expansion leaves the cemented tungsten carbide material stretched and the polycrystalline diamond under compression at the diamond/cemented carbide interface. This condition thus creates internal stresses in the diamond/cemented carbide interface. These stresses may be sufficient to actually cause either fracturing in the cemented tungsten carbide material or in the polycrystalline diamond portion of the compact structure, or delamination, a separating of the materials at the diamond/carbide bond. If either the fracturing of the polycrystalline diamond or cemented tungsten carbide, or delamination is significant the resulting compact structure is useless and must be considered as scrap, thereby reducing the yield of the manufacturing process.

Another form of compact structure which is a multiple layer structure having a polycrystalline diamond center layer bonded between two layers of tungsten or cemented carbide. In this multiple layer or sandwich compact structure the internal stresses in each polycrystalline diamond/tungsten or diamond/carbide interface are increased in comparison to the stresses in the two layer compact structure discussed above. In the multiple layer compact structure during cooling both tungsten or carbide layers shrink or compress at a different rate than the polycrystalline diamond and exert increased forces at the bonding interfaces. Since the polycrystalline diamond layer does not have a free surface similar in size and bonding surface as exists in the two layer compact it cannot yield to compensate for the increased internal stresses. As a result both fracturing in the tungsten or carbide layers and in the polycrystalline diamond layer, and delamination are increased. Thus, it is difficult to manufacture a multiple layer or sandwich compact structure and yield for such manufacturing operation is quite low.

Even if the resulting multiple layer compact structure does not have flaws sufficient to reject the product, subsequent bonding of the compact to the drill shaft increases these internal stresses and the possibility of failure. For example, the subsequently shaped multiple layer compact structure forming the cutting element is mounted on the tool, e.g., shaft by brazing or similar techniques. In the brazing technique the tungsten or diamond/carbide portion of the multiple layer compact, and the shaft are heated to a sufficient degree to induce bonding. During the subsequent cooling period, the internal stresses in the polycrystalline diamond/tungsten or diamond/carbide bonds created during the formations of the multiple layer compact structure are increased. The increased mass of material, namely the tungsten or carbide portion of the compact now attached to the shaft metal produces more stress after the brazed assembly is cooled due to the differences in the thermal contraction. The increased thermal contraction differential causes still increased stresses in the polycrystalline diamond/tungsten or diamond/carbide bonds and their increased stresses cause both increasing fractures in the polycrystalline and tungsten or carbide layers and delamination. These defects may be pronounced enough to cause an immediate failure which results in a rejected part. In some instances the increased stress and resulting problems simply weaken the assembly so that the useful life of the resulting tool is reduced.

3. Objects of the Invention

It is a general object of the present invention to alleviate the aforementioned problems. It is another general object of the present invention to provide a cutting element having a polycrystalline diamond material portion attached to a soft metal portion with reduced stresses in the element that result from the soft metal portion and polycrystalline material portion having different coefficients of thermal expansion.

It is a specific object of the present invention to provide a cutting element for machine operations comprising a polycrystalline material portion attached to at least one side portion or face with the side portion being made from a material having a Young's Modulus less than approximately $45 \times 10^6$ psi. It is yet another specific object of the present invention to provide a cutting element for machine operations comprising a polycrystalline material portion sandwiched between two side portions at least one of the side portions being made from a material having a Young's Modulus less than approximately $45 \times 10^6$ psi. It is still another specific object of the present invention to provide a cutting element for machine operations comprising a polycrystalline material center portion sandwiched between two side portions, each side portion being made from a material having a Young's Modulus less than approximately $45 \times 10^6$ psi.

It is another specific object of the present invention to provide a cutting element for machine operation comprising a polycrystalline material portion attached to at least one soft metal portion with the soft metal portion being made from a material selected from the group consisting of cobalt, nickel, iron, copper, silver, gold, platimum, palladium, alloys of these metals and intermetallic compounds containing these metals. It is another specific object of the present invention to provide a cutting element for machine operations comprising a polycrystalline material center sandwiched between two side portions with at least one of the side portions being made from a material selected from the group consisting of cobalt, nickel, iron, copper, silver, gold, platimum, pallidum, alloys of these metals and intermetallic compounds containing these metals. It is yet another specific object of the present invention to provide a cutting element for machine operations comprising a polycrystalline material center sandwiched between two side portions with each side portion being made from a material selected from the group consisting of cobalt, nickel, iron, copper, silver, gold, platinum, palladium, alloys of these metals and intermetallic compounds containing these metals.

SUMMARY OF THE INVENTION

The present invention is a cutting element for use in machine operations comprising a polycrystalline material center portion sandwiched between two side portions with at least one of the side portions being a soft metal. The soft metal portion is identified as a material having a Young's Modulus less than approximately $45 \times 10^6$ psi and is selected from the group consisting of cobalt, nickel, iron, copper, silver, gold, platinum, palladium, alloys of these metals and intermetallic compounds containing these metals. It is well known in the industry how to form a polycrystalline material compact structure comprising polycrystalline diamond or polycrystalline CBN bonded to a cemented carbide substrate. In such a compact structure, internal stresses are created at the polycrystalline material/cemented tungsten carbide bond due to the difference in the coefficient of thermal expansion between the polycrystalline material and the cemented carbide. These stresses are sometimes sufficient to cause either the polycrystalline material or cemented tungsten carbide portion of the compact to fracture, or to pull apart from each other.

In certain machine operations, such as drilling with a flat drill, it is desirable to secure the polycrystalline material layer between two side layers thus forming a multiple layer or sandwich compact structure. In the multiple layer compact structure the internal stresses are increased in the polycrystalline material due to the difference in the coefficient of thermal expansion between the polycrystalline material and the cemented carbide and the lack of a free surface of the polycrystalline material to yield in response to the increased stresses. These stresses are increased by the bonding of compact structure to the machine tool. The increased stress in the multiple layer compact structure often causes either fracturing in the polycrystalline material or cemented carbide layer, or separating between the layers.

The present invention reduces the stresses in a compact cutting element by using a soft metal as the second layer. The ability to use a soft metal to form a bond with the polycrystalline material is unexpected. The use of a soft metal for bonding with polycrystalline material in a high pressure press cycle would be expected to infiltrate and hinder the polycrystalline diamond or CBN growth. However, the observed infiltration does not necessarily prevent adequate polycrystalline diamond growth. In an alternative approach the soft metal layer can be bonded to the polycrystalline material layer in a post press technique such as electroplating, vapor deposition or other techniques. The successful use of such post press techniques was unexpected since sufficient adhesion with the polycrystalline material was not considered possible. In an alternative embodiment, both side layers are made from a soft metal.

When used as a spade portion of a flat drill, the cutting element of the present invention greatly extends the life of the drill since polycrystalline material extends throughout the vertical length of the spade portion enabling repeated resharpening of the cutting element.

DESCRIPTION OF THE DRAWINGS

The present invention will be more clearly understood from the following detailed description of the specific embodiments read in conjunction with the accompanying drawings, wherein.

It should be understood that the drawings are not necessarily to scale and that embodiments are illustrated by graphic symbols, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION

Figure 1A:
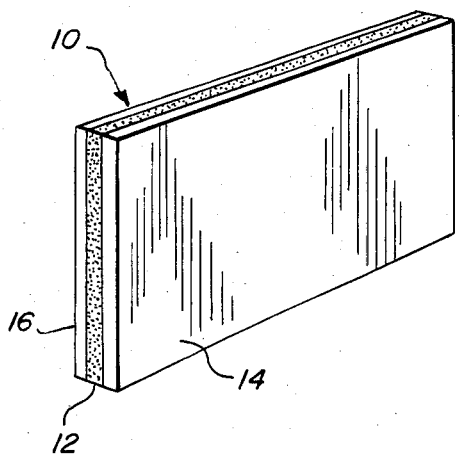
FIG. 1A is a perspective view of the cutting element sandwich made in accordance with the present invention having a center portion of polycrystalline diamond, one side portion of cemented carbide and another side portion of soft metal.

FIG. 1A shows a perspective view of the cutting element 10 of the present invention. The cutting element 10 comprises a polycrystalline diamond center layer 12, a right side portion 14 and a left side portion 16. Alternatively, the center layer 12 can comprise polycrystalline CBN. The right side portion is formed from a material having a high Young's Modulus commonly cemented carbide and usually cemented tungsten carbide, however other forms of cemented carbide can be used. The left side portion is formed from a material having a Young's Modulus less than approximately $45 \times 10^6$ psi and is selected from the group consisting of cobalt, nickel, iron, copper, silver, gold, platinum, palladium, alloys of these metals and intermetallic compounds containing these metals.

In the preferred method of forming the cutting element 10 a high pressure press technique, well known to those of ordinary skill in the art is used. In brief, tungsten carbide material is placed within a containment vessel of a high pressure press, next diamond starting material is placed over the cemented carbide and finally the soft metal material is placed over the diamond starting material. This combination of three materials is then subjected to sufficient high pressure and temperature to grow polycrystalline diamond. During this operation the polycrystalline diamond forms a bond with the other layers. In an alternatiave method, a compact structure comprising a polycrystalline diamond layer bonded to a cemented carbide layer is formed through well known high pressure press techniques. A second layer of soft metal is now bonded to the free surface of the polycrystalline diamond portion of the compact structure. Any one of several post press bonding techniques can be used such as electroplating, or vapor deposition. The actual method of bonding the soft metal to the polycrystalline diamond is well known and accordingly not described herein. The important aspect is the realization that the soft metal layer be bonded to the diamond with sufficient adhesion by a post press technique. Of course, in the embodiment where the soft metal is bonded to both sides of the polycrystalline diamond both soft metal layers could be attached by post press techniques. In this situation the polycrystalline diamond is formed the standard manner to a cemented carbide substrate and then the cemented carbide is removed, for example the cemented carbide layer is dissolved in an acid bath. Finally, it is possible to use the soft metal in the high pressure press technique to form one side layer bonded to the polycrystalline diamond and then form the second layer of soft metal by a post press technique.

In the standard procedure of the prior art only the carbide and the diamond starting material are placed in the containment vessel and the resulting structure is referred to as compact or composite compact. In this compact structure the bonding between the cemented carbide and diamond material is at a substantially stress free equilibrium state while the polycrystalline diamond is being formed. However, when the resulting structure is cooled to room temperature the cemented carbide which has a greater coefficient of thermal expansion than the polycrystalline diamond solidifies and contracts at a faster rate than the polycrystalline diamond. Due to the difference in the coefficient of thermal expansion between these materials the cemented carbide layer is stretched and the polycrystalline diamond layer is under compression. Accordingly, stress is created in the cemented carbide/polycrystalline diamond interface. Since the unbonded surface of the polycrystalline diamond is free a certain amount of stretching or deformation is present and these created stresses are usually insufficient to cause the polycrystalline diamond to fracture.

In prior art attempts to create a sandwiched cutting element with two layers of tungsten or cemented tungsten carbide placed on either side of the diamond starting material the internal stresses created at the two carbide/polycrystalline diamond interfaces is increased. In this type of sandwiched structure during cooling the polycrystalline diamond does not have a large unbonded surface to stretch or deform in response to internal stresses. Accordingly, the internal stresses in the polycrystalline diamond increased to the extent that the diamond frequently fractures.

The present invention reduces the increased stresses normally created in the sandwiched cutting element compact by using a soft metal as the second metal layer. The second soft metal layer is made from a material having a Young's Modulus which is sufficiently low to allow the metal to stretch or deform during cooling and yet form an integrated sandwiched cutting element.

The soft metal layer is made from a material having a Young's Modulus less than approximately $45 \times 10^6$ psi and is selected from the group consisting of cobalt, nickel, iron, copper, silver, gold, platinum, palladium, alloys of these metals and intermetallic compounds containing these metals.

Figure 1B:
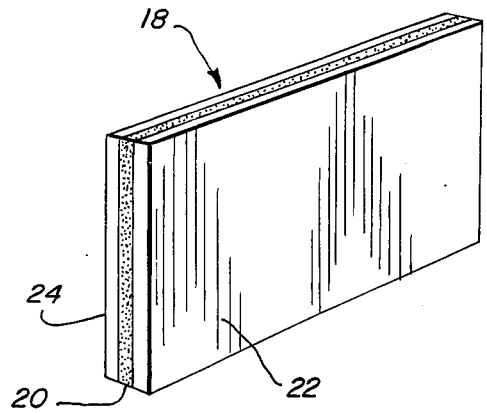
FIG. 1B is a perspective view of the cutting element sandwich made in accordance with the present invention having a center portion of polycrystalline diamond and both side portions made of soft metal.

In the alternative embodiment shown in FIG. 1B, the cutting element 18 has a polycrystalline diamond center layer 20, a right side layer 22 and left side layer 24. Both side layers 22 and 24 are soft metal made from a material having a Young's Modulus less than approximately $45 \times 10^6$ psi and are selected from the group consisting of cobalt, nickel, iron, copper, silver, gold, platinum, palladium, alloys of these metals and intermetallic compounds containing these metals. Of course, the two soft metal layers 22 and 24 may be the same material as described above or each layer 22 and 24 may be a different material provided each is selected from the group above.

In this alternative embodiment, the cutting element is produced in the same manner as described above except that the soft metal material is used for both layers in the press cycle. During the cooling period the internal stresses in the soft metal/polycrystalline diamond interface are reduced due to the stretching or deforming of the soft metal.

As set forth above, the soft metal layers can be attached to the polycrystalline diamond layer through post press techniques such as vapor deposition or electroplating. The same advantage of reduction of internal stresses between the soft metal/polycrystalline diamond interface occurs in the post press formation techniques. The fundamental aspect of this invention is to provide a compact structure having a polycrystalline diamond layer bonded to at least one side layer in which the side layer is made from a material which is sufficiently yielding that stresses in the polycrystalline diamond/side layer interface are so low that neither delamination nor fracturing of the polycrystalline diamond occurs.

It has been determined that certain material having a Young's Modulus less than approximately $45 \times 10^6$ psi meet the above standard. These materials are selected from the group consisting of cobalt, nickel, iron, copper, silver, gold, platinum, palladium, alloys of these metals and intermetallic compounds containing these metals. The use of these soft metals for bonding with polycrystalline material in a high press cycle would be expected to excessively infiltrate the diamond or CBN starting material and hinder polycrystalline growth thereby resulting in an unusable product. However, in actual operation it has been discovered that the expected infiltration does not occur in sufficient amounts to prevent proper polycrystalline diamond growth. Furthermore, the use of post press adhesion techniques to bond these soft metals to the diamond would be expected to result in a weak bond thereby resulting in an unusable product. However, in actual operation it has been discovered that the bond with the polycrystalline diamond is sufficiently strong.

Figure 2:
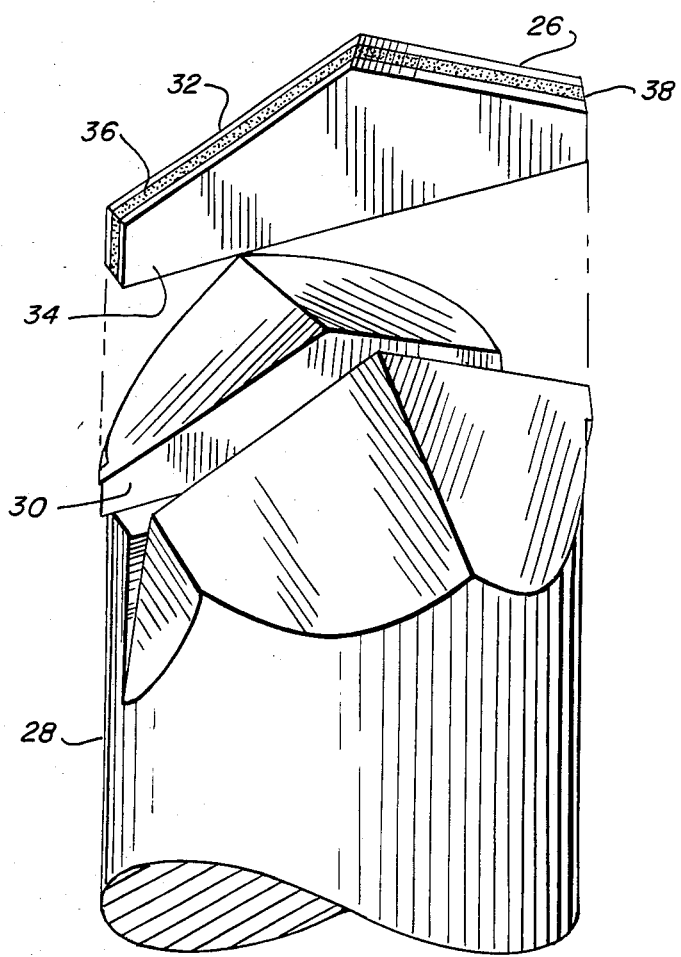
FIG. 2 is an exploded perspective drawing of the cutting member of the present invention shaped and positioned in a shaft forming a flat drill bit.

FIG. 2 shows one use for the cutting element of the present invention as the spade portion of a flat drill. Of course, the present invention can be used as cutting elements for other tools such as a fluted drill bit. The cutting element formed as described above is shaped by well known techniques to create the five cutting edges common to the flat drill. The shaping of the cutting element is well known in the art and forms no part of the present invention. The overall structure of the flat drill comprises a flat portion 26 and a shank portion 28. The shank portion 28 has a slit 30 extending across its top surface and adapted to receive the flat portion 26.

In the prior art, the flat portion comprises the polycrystalline diamond center layer and two layers of tungsten to form the sandwich. The cutting element or flat portion is secured to the shank portion by brazing or other conventional techniques. In the brazing operation the flat portion is again heated which tends to reduce the internal stresses in the tungsten/polycrystalline diamond interface. However, during cooling the mass of the shank portion is added to the two tungsten layers which further diminishes the yieldability of the structure to internal stresses and increases the fracturing of the diamond and delamination during cooling.

In the preferred embodiment the cutting element comprises a polycrystalline diamond center layer 36, a cemented carbide, side layer 32 and a soft metal layer 34. Alternatively, the center layer 36 can comprise polycrystalline CBN. Again, the soft metal layer 34 permits increased stretching or deforming in response to the internal stresses created during the attachment operation and prevents failure due to fracture of the diamond or delamination.

An additional benefit to the cutting element of the present invention forming the flat portion 26 is the extended length of the margin cutting edge 38. Since the polycrystalline material center layer extends the entire length of the center portion, the margin cutting edges 36 and 38 are not limited to the thickness of the polycrystalline material as described in the above referred to co-pending application. When the flat portion 26 becomes dull due to use, it can be resharpened but in the prior art the number of sharpening operations is limited by the thickness of the polycrystalline material. In the present invention, the number of resharpenings is greatly increased due to the length of the polycrystalline material center layer 36.

It should be understood by a person skilled in the art that other embodiments or uses of this invention exist. It is neither important that the polycrystalline material layer be of any particular thickness nor that the two side layers be of any particular thickness with respect to the polycrystalline diamond layer. The essential thing is that at least one of the side layers be a material which stretches and deforms sufficiently to preclude fracturing in the polycrystalline diamond or delamination due to stress.

From the above description, it is apparent that the objects of the present invention have been achieved. While only certain embodiments have been set forth, alternative embodiments and various modifications will be apparent from the above description to those skilled in the art. These and other alternatives are considered equilvalents and within the spirit and scope of the present invention.

What is claimed is:

1. A cutting element having a center layer of polycrystalline material, an exposed side layer said side layer being directly bonded to the polycrystalline material layer without an intervening layer, and an exposed opposite side layer of material having a Young's Modulus less than approximately $45 \times 10^6$ psi said opposite side layer being directly to the polycrystalline material layer without an intervening layer.

2. A cutting element as set forth in claim 1 wherein said side layer comprises cemented carbide.

3. A cutting element as set forth in claim 2 wherein said material of said opposite side layer is selected from the group consisting of cobalt, nickel, iron, copper, silver, gold, platinum, palladium, alloys of said metals and intermetallic compounds containing said metals.

4. A cutting element as set forth in claim 1 wherein said material of said opposite side layer is selected from the group consisting of cobalt, nickel, iron, copper, silver, gold, platinum, palladium, alloys of said metals and intermetallic compounds containing said metals.

5. A cutting element as in claim 4 wherein said side layer comprises tungsten.

6. A cutting element as in claim 1 wherein said side layer comprises tungsten.

7. A cutting element having a center layer of polycrystalline material, an exposed side layer of material having a Young's Modulus less than approximately $45 \times 10^6$ psi said side layer being directly bonded to the polycrystalline material layer without an intervening layer, and an exposed opposite side layer of material also having a Young's Modulus less than approximately $45 \times 10^6$ psi and said opposite side layer also being directly to the polycrystalline material layer without an intervening layer.

8. A cutting element as set forth in claim 7 wherein said material of each of said exposed layers is independently selected from the group consisting of cobalt, nickel, iron, copper, silver, gold, platinum, palladium, alloys of said metals and intermetallic compounds containing said metals.

9. A rotary bit having a shaft defining an axis of rotation, and a cutting element connected to one end of said shaft, said cutting element comprising:
- a polycrystalline material center layer extending through and disposed symmetrically about said axis, and forming a plurality of cutting edges;
- a side layer of material having a high Young's Modulus and being directly bonded without an intervening layer to said polycrystalline material center layer; and,
- an opposite side layer of material having a Young's Modulus less than approximately $45 \times 10^6$ psi and being directly bonded without an intervening layer to said polycrystalline material center layer.

10. A rotary bit as set forth in claim 9 wherein said side layer comprises cemented carbide.

11. A rotary bit as set forth in claim 10 wherein said opposite side layer is selected from the group consisting of cobalt, nickel, iron, copper, silver, gold, platinum, palladium, alloys of said metals and intermetallic compounds containing said metals.

12. A rotary bit as set forth in claim 9 wherein said material of said opposite side layer is selected from the group cobalt, nickel, iron, copper, silver, gold, platinum, palladium and alloys of said metals and intermetallic compounds containing said metals.

13. A cutting element as in claim 12 wherein said side layer comprises tungsten.

14. A cutting element as in claim 9 wherein said side layer comprises tungsten.

15. A rotary bit having a shaft defining an axis of rotation, and a cutting element connected to one end of said shaft, said cutting element comprising:
- a polycrystalline material center layer extending through and disposed symmetrically about said axis, and forming a plurality of cutting edges;
- a side layer of material having a Young's Modulus less than approximately $45 \times 10^6$ and being directly bonded without an intervening layer to said polycrystalline material center layer; and,
- an opposite side layer of material having a Young's Modulus less than approximately $45 \times 10^6$ psi and being directly bonded without an intervening layer to said polycrystalline material center layer.

16. A rotary bit as set forth in claim 15 wherein said side layer is selected from the group cobalt, nickel, iron, copper, silver, gold, platinum, palladium, alloys of said metals and intermetallic compounds containing said metals.

17. A rotary bit as set forth in claim 16 wherein said opposite layer is selected from the group consisting of colbalt, nickel, iron, copper, silver, gold, platinum, palladium, alloys of said metals and intermetallic compounds containing said metals.

* * * * *

UNITED STATES PATENT AND TRADEMARK OFFICE
CERTIFICATE OF CORRECTION

PATENT NO. : 4,627,503
DATED : Dec. 9, 1986
INVENTOR(S) : M. Duane Horton

It is certified that error appears in the above-identified patent and that said Letters Patent is hereby corrected as shown below:

IN THE ABSTRACT

Line 1, please delete "diamond" and substitute therefor --material--;

Line 3, after "diamond" insert --or CBN--;

Line 13, please delete "signficantly" and substitute therefor --significantly--.

IN THE BACKGROUND OF INVENTION

In column 4, line 55, please delete "diamond/".

IN THE DETAILED DESCRIPTION

In column 7, line 52, after "metal layer" insert --can--;

In column 7, line 58, after "formed" insert --in--.

UNITED STATES PATENT AND TRADEMARK OFFICE
CERTIFICATE OF CORRECTION

PATENT NO. : 4,627,503

DATED : Dec. 9, 1986

INVENTOR(S) : M. Duane Horton

It is certified that error appears in the above-identified patent and that said Letters Patent is hereby corrected as shown below:

IN THE CLAIMS

In Claim 17 (column 12, line 26), please delete "colbalt" and substitute therefor --cobalt--.

Signed and Sealed this

Eighteenth Day of October, 1988

*Attest:*

DONALD J. QUIGG

*Attesting Officer*  *Commissioner of Patents and Trademarks*